June 23, 1964     R. R. MANDY     3,137,881
WINDSHIELD WASHER AND WIPER COMBINATION
Filed July 11, 1962     2 Sheets-Sheet 2
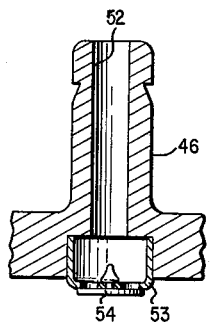
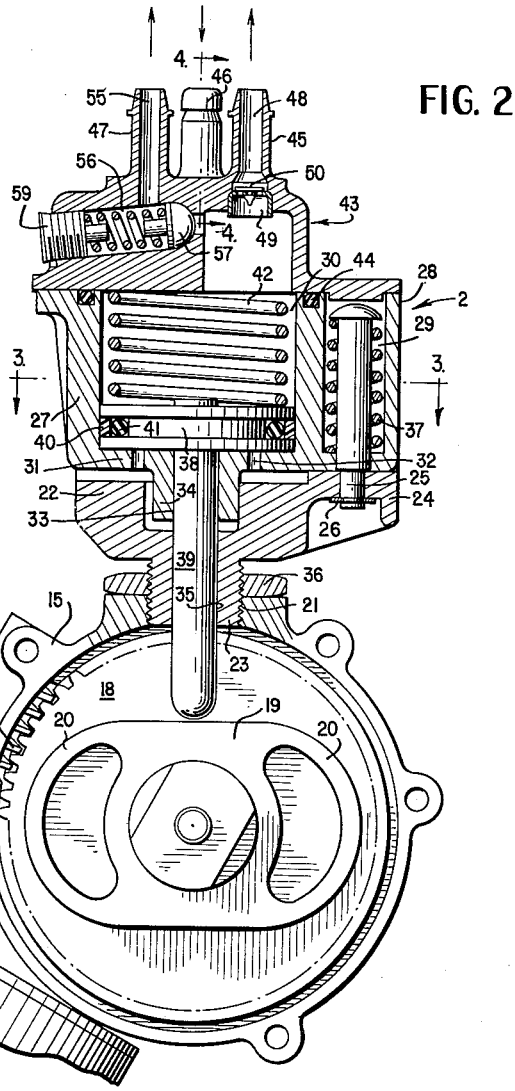
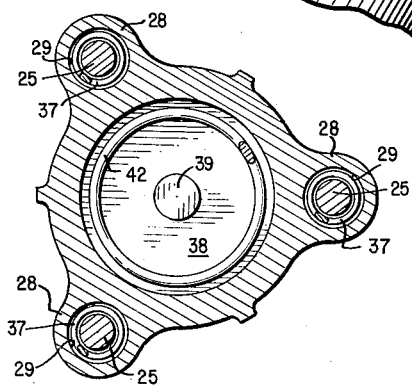
INVENTOR.
ROBERT R. MANDY
BY Rudolph L. Lowell
ATTORNEY United States Patent Office 3,137,881
Patented June 23, 1964

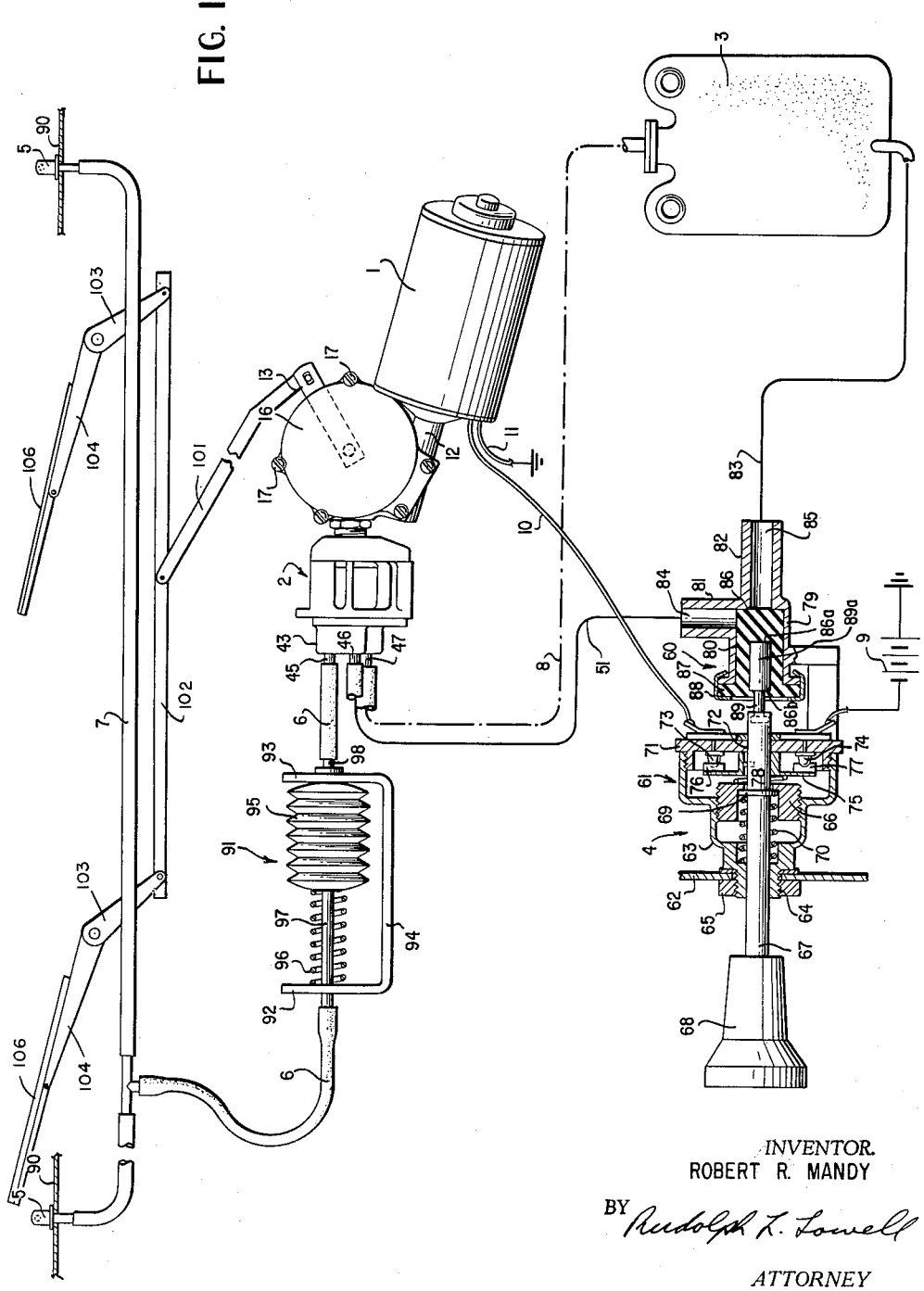

1

3,137,881
WINDSHIELD WASHER AND WIPER
COMBINATION
Robert R. Mandy, Detroit, Mich., assignor to The
Delman Company, Cookeville, Tenn., a corporation of Tennessee
Filed July 11, 1962, Ser. No. 209,068
14 Claims. (Cl. 15—250.02)

The present invention relates to windshield cleaning systems and in particular to a novel system wherein a solvent or other liquid cleaning substance is applied to the surface of a windshield conjointly with the continuous operation of an oscillating wiper. In systems of the type dealt with by the present invention, a liquid spray is applied directly to the surface of the windshield by means of a fluid pump which may be driven by the continuously operating wiper motor with the pump means being selectively connected and disconnected from the wiper motor at the will of an operator.

In the prior art, much difficulty has been encountered in devising suitable systems for connecting and disconnecting the pumping means from the constantly operating wiper motor. In the past, many systems have been proposed which involve the use of electrical relays, solenoids, Bowden wire cables and the like which have proved undesirable from the standpoint of maintenance and cost of installation. Other problems have been encountered such as suitable means for relieving the pump and fluid conduits in case of freeze-up and also in the provision of a constant spray of fluid against the windshield as opposed to intermittent surges or pulses produced by conventional pumping systems. The present invention is aimed at alleviating these problems, while, at the same time, providing a simple and efficient system requiring minimum attention from the driver of the automobile.

The primary object of the present invention is therefore, to provide a windshield washing and wiping combination wherein a liquid spray is provided by a fluid pump driven directly from the continuously operating wiper motor, with means being provided for the operator to selectively connect and disconnect the pump means from the wiper motor.

A further object of the present invention is to provide a windshield washer and wiper combination of the type mentioned wherein the pump means may be selectively connected and disconnected from the continuously operating wiper motor without the use of complicated relays, solenoids or Bowden wire cables or the like.

A further object of the present invention is to provide a windshield washing system of the type disclosed wherein a constant flow or spray can be applied to the windshield during the operation of the washing system.

A further object of the invention is to provide a windshield washer and wiper system wherein provision is made for the relief of the pumping means means and the fluid conduits in case of a freeze-up or blocking of the fluid conduits or pump means.

A further object of the present invention is to provide a pumping means for a windshield washing system wherein the pumping means is driven directly from a constantly rotating cam connected to the wiper motor.

A still further object of the present invention is to provide a windshield washer and wiper system wherein an operator may disconnect the pumping means by the operation of a valve on the suction side of the pump means to provide a vacuum seal to hold the pump piston away from a constantly rotating cam.

The means by which the foregoing objects and other advantages, which will be apparent to those skilled in the art, are accomplished are set forth in the following specifications and claims and are illustrated in the accompanying drawings dealing with a preferred embodiment of the invention. Reference is now made to the accompanying drawings in which:

FIGURE 1 is a diagrammatical representation of the over-all system showing the location of the various components and the details of the control valve for the washer system.

FIGURE 2 is a view showing the pump and wiper motor combination with the pump being illustrated in cross-section.

FIGURE 3 is a further cross-section view of the pump taken along lines 3—3 of FIGURE 2.

FIGURE 4 is a cross-sectional detail taken along lines 4—4 of FIGURE 2.

Referring now to the drawings, wherein like reference numerals are used to indicate identical parts in the various views, the system includes a conventional electric motor 1 having mounted thereon a fluid pump unit 2 which is connected on its inlet side to a fluid solvent reservoir 3 through a combination switch and valve unit 4. The outlet side of the pump unit 2 is in turn connected to nozzles 5 by means of conduits 6 and 7. The pump unit 2 has a further connection with the reservoir 3 by means of a bypass conduit 8.

The details of the wiper motor and washer pump unit will be first described with relation to the details shown in FIGURE 2. The wiper motor 1 is operated by means of a source of electrical energy 9 through the switch and valve means 4 and the electrical leads 10 and 11. The operation of the wiper motor may be selectively controlled by means of the switch and valve combination 4, the details of operation of which will be presently described. The wiper motor 1 has the necessary transmission gearing located in a gear housing 12 at one end thereof, for the purpose of transmitting a constant drive to the oscillating wiper arm 13 and a constantly rotating worm gear 14. The exact details of the gearing arrangement for driving the wiper arm 13 and the worm 14 form no part of the present invention and may be accomplished in any desired manner by means of any suitable gearing transmission which is commercially available. The only critical requirement for the present combination is the constantly driven worm gear 14 suitably mounted in the gear housing 12.

The wiper unit includes the motor 1 and the worm gear transmission which drives the wiper arm 13. A connecting link 101 is pivoted at one end to the arm 13 and at the other end to a reciprocating wiper bar 102. The opposite ends of the bar 102 are pivotally connected to wiper crank arms 103. Arm and shaft units 104 connect the crank arms 103 with windshield wiper blades or members 106. In actual practice, the wiper blades 106 contact the windshield of the automobile and the shaft portion of the units 104 are rotatably mounted on the body of the automobile. With this arrangement, the motion of the wiper arm 13 will be transferred to the wiper blades 106 through the bar 102 and crank arms 103.

As shown in FIG. 2, a gear casing 15 is mounted on the housing 12 and may include a cover 16 secured thereto by means of bolts 17 in a well known manner. Mounted within the casing 15 is a rotatable driving gear 18, the teeth of which engage the worm 14 to be constantly driven thereby. The gear 18 includes an upstanding cam member 19 affixed to the surface thereof opposite the housing 12. The cam 19 includes diametrically opposite eccentric surfaces 20 which are designed to contact the pump plunger in a manner to be described. The cam 19 may be either made integral with the gear 18 or may be a separate element affixed thereto. In practice, it has been found that a plastic material such as hard nylon provides an excellent material for constructing the gear 18 and the cam 19. This material lends a certain resiliency to the drive connection and is, at the same time, tough enough to withstand wear at the points of contact.

A threaded opening 21 is provided in the side of the casing 15 for the purpose of mounting the body of the pump unit 2 and for the insertion of the piston rod of the pump plunger.

The pump unit 2 includes a stationary mounting base 22 which has a hollow threaded projection 23 for reception into the threaded opening 21 of the casing 15. The base structure 22 further includes spaced projections 24 about its outer periphery for the reception of mounting posts 25, the ends of which pass through suitable holes in the projections 24 and are retained in position by any suitable means such as snap rings 26. The posts 25 serve to locate and maintain the hollow pump cylinder 27 in place on the pump base 22. As viewed most clearly in FIGURES 2 and 3, the pump cylinder is generally cylindrical in form and includes three hollow projections 28 around its outer surface which correspond to the projections 24 on the pump base 22. Each of the projections 28 includes a bore 29 for the reception of the posts 25 with the opening at the bottom of the bores 29, as shown in FIGURE 2, being of substantially the same diameter as the posts 25 to allow the posts to pass therethrough. In further detail, the bores 29 are open at the top portion to enable the posts 25 to be inserted within the bores 29 and to be passed through the pump base 22 to be locked in position. The pump cylinder further includes the central bore 30 for the reception of a pump piston and a bottom portion 31 which serves to substantially close off the bottom of the cylinder bore. The bottom portion 31 is provided with vent openings 32 as well as a central opening 33 to allow the movement of the piston rod. A cylindrical projection 34 extends downwardly from the bottom 31 into the body of the pump base 22. The projection 34 with its opening 33 serves to further align the pump cylinder 27 on the base 22 and coacts with a bore 35 to provide a guide for the reciprocating pump piston.

In mounting the assembly thus far described, the pump base 22 will be threaded into the opening 21 in the casing 15 and a lock nut 36 will be securely tightened against the casing 15 to hold the base 22 in place. The pump cylinder 27 will then be positioned atop the base 22 with the projections 28 coinciding with the projections 24 on the base 22. Helical springs 37 will then be fitted over the posts 25 to bear against the heads of the posts with the spring and post assemblies then being placed in the bores 29 with the ends of the posts 25 passing through the openings in the projections 24. The helical springs 37 are formed to provide a predetermined bias between the pump cylinder 27 and the base 22 upon depressing the posts 25 and locking the same in place by means of the snap rings 26.

A pump piston 38 is located within the bore 30 and includes a cylindrical piston rod 39 which extends downwardly through the opening 33 in the projection 34 and through the bore 35 in the pump base and finally into the body of the casing 15. The piston rod 39, as shown in FIGURE 2, has a spherical shaped end portion which is designed to be contacted by the eccentric portions 20 on the cam 19. As indicated in FIGURE 2, the piston rod 33 will extend a substantial distance into the casing 15 when the piston 38 is at the bottom of the bore 30 so that the eccentrics 20 will move the piston a full stroke as they contact the piston rod during rotation. The piston 38 is fitted with a suitable Teflon seal 40 which is backed up by a suitable O-ring 41. The seal 40 and the O-ring 41 are contained in a suitable peripheral channel about the piston 38. To complete the structure of the pump cylinder, a helical return spring 42 is seated against the working face of the piston 38 and bears against a cylinder cover 43 which is secured to the open top of the cylinder 27 in any suitable manner so as to close off the bores 29 and the central bore 30 of the cylinder. Any suitable clamping means or screw fastening means may be utilized to secure the cover 43 to the cylinder 27 and an annular sealing ring 44 may be provided to perfect a fluid tight seal between the cover and the cylinder in a well known manner.

The cover 43 is fitted with three hose nipples 45, 46 and 47 to provide the necessary attaching means for the hose members or conduits of the system. The nipple 45 includes an outlet passage 48 which is designed to register with a hose or conduit 6 which is fitted over the nipple 45 as shown in FIGURE 1. Mounted within the outlet passage 48 is a check valve unit which includes a metallic seating ring 49 and a flexible seating flap 50 which is snapped into engagement with the seating ring 49. The seating ring 49 may be force fitted so as to securely fasten within the outlet passage 48.

The nipple 46 is designed to receive the inlet hose or conduit 51 as shown in FIGURE 1 with the nipple 46 further including an inlet passage 52 which also registers with the internal portion of the cover 43 and the bore 30. The details of the nipple 46 and passage 52 are illustrated in FIGURE 4. The inlet passage 52 further includes a check valve seating ring 53 and a valve flap 54 which is identical in structure to the ring 49 and the flap 50 of the outlet passage 48, except for the fact that the seating ring 53 and the flap 54 are so positioned in the inlet passage 52 to permit inlet flow of liquid and to prevent a back flow through the inlet passage. This arrangement is clearly shown in FIGURE 4.

The nipple 47 is designed to receive the bypass conduit or hose member 8 as shown in FIGURE 1 and includes a bypass passage 55 for the cover 43. The bypass passage 55 is connected to the interior of the cover 43 and the bore 30 through a chamber 56 which contains a spring pressed check valve 57 which is held in the closed position by the helical spring 58, the bias of which may be adjusted by means of the screw plug 59. The bypass conduit or hose 8 connects the nipple 47 with a solvent reservoir 3. The reservoir 3 is illustrated as a plastic container which is designed to be fastened to an automobile at any convenient spot beneath the hood. It will be understood that the reservoir 3 may take any suitable form such as a glass or metallic container or any other style container available for that purpose.

Looking now to the combination switch and valve indicated generally by the reference character 4 in FIGURE 1, said unit embodies the valve 60 and a switch member 61 with the entire combination unit being designed to be mounted on the dashboard 62 of an automobile so as to be convenient to the driver.

Referring first of all to the switch portion 61 of the unit 4, a bell-shaped switch housing 63 is securely affixed to the dashboard 62 by means of the threaded shoulder 64 and a lock nut 65 in a well known manner. Located within the housing 63 is a guide member 66 which has a central opening which cooperates with a central opening in the shoulder 64 to provide a guide for the rotatable and reciprocable operating rod 67. The rod 67 further includes a knob 68 and an annular flange 69 located on the shank of the rod and spaced from the knob 68. A helical compression spring 70 surrounds the rod 67 and seats at one end against the flange 69 and at the other end against the shoulder 64. With this arrangement, it will be readily apparent that the rod 67 may be reciprocated within the housing 63 and may also be rotated in either direction within its mounting. A backing plate 71 is fitted to the housing 63 by any convenient means such as the screw threaded attachment shown in FIGURE 1. The backing plate 71 includes a central opening 72 to accommodate the rod 67 and two contact elements 73 and 74 which are in turn electrically connected to the motor lead 10 and to the lead wire of the electrical source 9 respectively. To complete the structure of the switching portion of the unit 4, a bridging element 75 is mounted on the rod 67 by means of a key and slot arrangement as illustrated in FIGURE 1, for the purpose of allowing the rod 67 to reciprocate with relation to the member 75 while at the same time allowing the operator to control the rotary position of the member 75 by rotating the knob 68. The member 75 further includes contacts 76 and 77 which cooperate with the contacts 73 and 74 respectively of the backing plate 71 for the purpose of energizing the wiper motor 1 when these contact members are in registry, as illustrated in FIGURE 1. A spring member 78 maintains the bridging member 75 in position against the backing plate 71 at all times and prevents axial movement of the member 75 when the rod 67 is reciprocated. With this switching arrangement it will be understood that the operator may energize the wiper motor 1 at will, by rotating the knob 68. The wiper motor 1 will continue to operate as long as the switch contacts remain in the position shown in FIGURE 1.

The valve portion 60 of the unit 4 is rigidly connected to the switch 61 by means of a connecting arm which is an integral part of the backing plate 71. The connecting arm may be securely attached to the valve body 79 by any suitable means such as welding, brazing or by screw attaching means. The valve body 79 is cylindrical in form and includes a central bore 80 and two hose connections 81 and 82, with the connection 81 being connected to the hose 51 leading to the pump 2 and the connection 82 being connected to a hose member 83, which in turn leads to the reservoir 3. The connection 81 provides an outlet passage 84 for the valve body and the connection 82 provides an inlet passage 85 for the valve body.

Mounted within the bore 80 in the valve body is a resilient valve seating member 86 which normally fills the inside of the bore 80 and includes an annular flange 87 which is clamped to the valve body by means of a clamping washer 88 so as to prevent removal of the resilient valve seating member 86 from the bore 80. The seating member 86 is composed of a suitable highly resilient material such as rubber, or its equivalent. The seating member 86 is molded with a cavity 86a having a reduced inlet opening so as to form an annular inwardly extended lip or flange 86b. The operating stem 89 is formed with an enlarged end section 89a, which is received within the cavity 86a by distention of the lip 86b, which then acts to releasably hold the section 89a within the cavity 86b.

The stem 89 is connected to the operating rod 67 so as to allow the rod 67 to be rotated with respect to the stem 89 while, at the same time, providing for longitudinal movement of the stem 89 with the rod 87 upon actuation by the operator. Such a connection is illustrated in FIGURE 1 wherein the rod 67 has an end portion which loosely surrounds a flange on the stem 89. This type of joint is subject to many different designs such as the reverse construction from that shown in FIGURE 1, a ball and socket joint or the like. With relation to the connection between the operating stem 89 and the seating member 86, the only essential attribute is a rigid connection between the valve stem 89 and the material of the valve seating member in a longitudinal direction. This connection may also take various forms in addition to that shown.

As aforementioned, the means for retaining the resilient member 86 within the bore 80 comprises a clamping washer 88 which contacts the flange 87 of the resilient member and a portion of the valve housing. As illustrated in FIGURE 1, the washer 88 contacts only the flange portion 87 of the resilient seating member 86 so as to allow the flange 87 of the member 86 to be deformed through the central portion of the washer 88 upon longitudinal movement of the stem 89 to the left as viewed in FIGURE 1. In other words the flange 87 functions as a diaphragm to permit distention, or outward bowing, of the member 86 through the opening of the washer 88. The purpose of this arrangement will now be described.

The seating member 86 is illustrated in its normally closed position in FIGURE 1, wherein the member 86 is in a clearance relation with the outlet passage 84 and covers the inlet passage 85 of the valve body to thus prevent any fluid from passing from the reservoir 3 to the pump member 2. When it is desired to open the passage, between the reservoir and the pump, the operator pulls on the knob 68 to move the rod 67 and the stem 89 of the seating member to the left. This will result in deformation of the resilient member 86 through the opening in the washer 88, concurrent with the withdrawal of the seating member from the closed position as shown in FIGURE 1, to an open position so as to uncover the inlet passage 85. Fluid will now be allowed to pass through the valve unit from the reservoir 3 upon operation of the pump.

It will also be noted that the pulling force applied to the knob 68 and the rod 67 is resisted by the bias of spring member 70 so that the passages 84 and 85 will be connected only as long as the operator maintains the pulling force on the rod 67. Immediately upon releasing the knob 68, the spring 70 will return the operating rod 67 to the position shown in FIGURE 1, wherein the inlet passage 85 will be closed off by the resilient material of the seating member 86. The actuation of the operating rod 67 and the seating member 86 just described will not interfere with the position of the bridging member 75 so that the continuous operation of the wiper motor will not be affected by the operation of the valve unit 60.

Looking now to the apparatus associated with the outlet nipple 45 of the pump 2, the conduit or hose 6 conveys the pressurized fluid from the pump 2 to a second conduit 7 which normally has two spray nozzles 5 connected to its terminal ends. The number of nozzles is, of course, not limited to two and it will be understood any number of nozzles, such as nozzles 5, may be serviced by the conduit 7, and these nozzles will normally be connected to the surface 90 of the automobile body adjacent a windshield or other window surface of the automobile which is to be cleaned. In standard practice, the nozzles 5 are located closely adjacent to the oscillating wiper members and are so constructed to provide a fan type spray over a substantial area of the windshield or window which is contacted by the wiper member.

Located in the outlet fluid conduit 6 between the pump unit 2 and the spray nozzles 5 is a surge chamber assembly or pulse converter 91 which serves to convert the pulsating pressure from the pump unit 2 to a steady stream of liquid under pressure to the spray nozzles 5. In structure, the pulse converter 91 comprises a U-shaped frame having upstanding legs 92 and 93 and a bottom connecting member 94. An expandable bellows 95 is mounted between these upstanding legs 92 and 93 and bears against one of the legs 93 at one end and seats against a compression spring 96 at the other end. The compression spring 96 in turn seats against the opposite leg 92 of the U-shaped member. The left hand side of the bellows 95, as illustrated in FIGURE 1, has a rigid pipe 97 extending therefrom which passes through a suitable hole in the leg 92 and is permitted to reciprocate with relation to the leg 92. The end of the pipe 97 remote from the bellows 95 is in turn connected to one portion of the conduit 6. The right side of the bellows 95 may be rigidly affixed to the leg 93 and has a second rigid pipe 98 extending therefrom and connected to the second portion of the flexible conduit 6. The U-shaped frame comprising the members 92, 93 and 94 may be rigidly connected to the body of the automobile beneath the hood or may, in the alternative, be merely supported by any portion of the automobile beneath the hood since there will be no forces tending to translate the U-shaped member and the only reaction will be between the legs 92 and 93 of the U-shaped member. During operation of the reciprocating pump 2, successive pressure pulses or surges will be produced, and, as each pulse is received, the bellows 95 will expand between the legs 92 and 93, thus compressing the spring 96. After each successive pulse, the pressure from the pump 2 will drop to zero and, with the drop in pressure, the spring 96 will expand to again compress the bellows 95 resulting in a discharge of liquid from the bellows. In this manner, the pulse converter produces pressure pulses within the conduit 6. The pulses produced by the converter will occur between the pump pulses, thus resulting in a steady flow of liquid under pressure to the nozzles 5. This action will, of course, result in a steady stream or spray from the nozzle 5 instead of the conventional squirts or intermittent spray which would normally result from the reciprocating pump unit 2 if utilized alone.

Having described the details of the washer and wiper system, including the details of construction of each of the components of the system, and with this structure in mind, the over-all operation of the system will now be described with the system being applied to the windshield of an automobile in a conventional fashion. In the event of inclement weather conditions, the driver of the automobile first rotates the knob 68 of the switch and valve unit 4. This will energize the electric wiper motor 1 in the manner previously described, resulting in oscillation of the wiper arm 13 and the connected wiper members 106. The operation described constitutes a normal function of a wiper system and in the present invention this function may be carried out by the simple rotation of the control knob 68 without initiating or disturbing the windshield washer system involved. The primary purpose of the present invention is the utilization of the apparatus described during other periods when the windshield is covered with road dirt or other material so as to obstruct the motorist's vision. In this case, the wiper motor is energized as described with the position of the operating rod 67 being in its normal position as illustrated in FIGURE 1, so as to prevent the passage of liquid from the conduit 83 and the reservoir 3 to the conduit 51 connected to the inlet side of the pump 2. With the operation of the wiper motor 1, the gear 18 and the cam 19 will be continuously rotated. Upon initial contact of one of the eccentrics 20 of the cam 19 with the piston rod 39 of the pump, the piston 38 will be given a full stroke against the bias of the spring 42, thus expelling whatever liquid or air is present in the pump cylinder past the check valve 49 and into the conduit 6. The fluid present in the pump cylinder will flow through the perforations in the seating ring 49 and past the flexible flap 50 with backflow being prevented by the closing of the flap 50 over the perforations. Bearing in mind that the inlet conduit 51 of the pump is sealed by the seating member 86, the return spring 42 will be ineffective to return the piston 38 to the position shown in FIGURE 2 against the vacuum seal thus provided. It is obvious that as long as the inlet conduit 51 is blocked off from the reservoir by the member 86, the oscillating wiper system will operate in a conventional manner.

With the wiper motor 1 in operation and upon the desire of the motorist to provide a spray of liquid or solvent to the windshield, a pulling force is applied to the operating rod 67 to deform the seating member 86 to thus connect the passages 84 and 85 and allow the liquid or solvent in the reservoir 3 to flow to the inlet passage 52 of the pump and past the inlet check valve 53, 54. This action is, of course, accomplished without disturbing the operation of the wiper motor 1. The reservoir 3 will be open to atmosphere to allow the flow of solvent through the valve unit 4 and to the inlet side of the pump 2. Upon opening of the seating member 86, the return spring 42 of the pump returns the piston 38 to the position as shown in FIGURE 2 to be contacted by the eccentrics 20. With the valve seating member 86 in its open position and with the continuous operation of the cam 19, the pump piston 38 will be operated in a well known manner to draw liquid solvent through the inlet conduit 51 and to discharge the liquid under pressure through the outlet conduit 6 to the spray nozzles 5. The liquid under pressure will be delivered to the pulse converted unit 91 and will be converted into a steady pressurized flow to the spray nozzles 5 as previously described. As soon as the operator decides that enough liquid has been sprayed on the windshield, he needs only to release the knob 68 and the return spring 70 will again allow the seating member 86 to close off the passages 84 and 85 from the reservoir. With the suction side of the pump 2 closed, the piston member 38 will again be held in position at the end of its stroke with the piston rod 39 being out of reach of the rotating eccentrics 20 thus terminating the spray on the windshield.

It will be thus seen that the windshield washer system may be turned off and on at will by the motorist during the continuous operation of the wiper motor 1 without disturbing the operation of the wiper motor and without the necessity of separate switches, solenoids, relays or complicated Bowden wire connections. It will also be apparent that the wiper motor 1 may be initially energized with the seating member 86 being in its open position to give a substantially concurrent operation of the oscillating wipers and the liquid spray. If at any time the nozzle members 5 should become clogged with foreign matter, or in the event that the hose member 6 becomes obstructed, a safety bypass flow is provided by means of the spring pressed bypass valve 57. The valve 57 will be set to open at a predetermined high pressure above the normal pressure produced by the reciprocating pump piston 38. In the event of a clogging of nozzles or the obstruction of the conduit 6, the fluid will simply be channeled past the valve 57 and through the bypass passage 55, the conduit 8, and back to the reservoir 3 without damage to the conduit hoses or pump mechanism.

The novel pump unit 2 of the present invention is also equipped with emergency relief means to prevent damage to the pump mechanism and to the rotating cam 19 in the case of a complete freeze-up of the pump unit. During periods of extreme cold weather, it has not been uncommon for washer systems of the prior art to be damaged when the water or liquid solvent within the system becomes frozen. According to the present invention, the three spring members 37, which bias the pump cylinder 27 against the pump base 22, will be precalibrated so as to allow the entire pump cylinder 27 to separate from the pump base 22 in case the liquid within the chamber or bore 30 becomes solidified, thus preventing the movement of the piston 38. The combined force exerted by the three springs 37 will be set so as to be greater than the resistance on the pump piston 38 provided by the return spring 42 and the pumping operation during normal periods, but will yield upon freezing of the pump piston. In calibrating the force of the three springs 37, such combined force will also be set at a value which will allow reciprocation of the entire pump cylinder 27 and piston rod 39 without damage to the constantly rotating cam 19 and eccentrics 20. As previously mentioned, further protection along these lines may be obtained by utilizing a plastic material such as hard nylon in the construction of the gear 18 and the cam 19 with its eccentric portions 20. In the event that a freeze-up does occur, the driving cam 19 will simply operate to reciprocate the entire pump cylinder until the frozen liquid has melted.

Having thus described the details of the construction and operation of the present invention, it will be readily appreciated by those skilled in the art that the present invention provides novel and useful improvements in washer and wiper combination systems of the type described. The arrangement and types of structure components utilized within this invention may be subjected to numerous modifications well within the purview of this invention and applicant intends only to be limited to a liberal interpretation of the specification and appended claims.

Having thus described the invention, what is claimed as new and desired to be secured by Letters Patent is:

1. A windshield cleaning system comprising, a windshield wiper unit, said wiper unit including an electrical motor means for driving associated wiper blades, a constantly rotating cam driven by said motor, a washer unit including pump means, a source of liquid, spray nozzles mounted adjacent an associated windshield, a first conduit means connecting said pump to said source, and a second conduit means connecting said pump to said nozzles, said pump means further including a reciprocating member for displacing liquid from said source to said nozzles, said reciprocating member being mounted adjacent said rotating cam to be driven thereby, and a combination valve and switch unit located in said first conduit, whereby said combination unit may be operated to selectively control the operation of said wiper motor and said first conduit may be closed off by said valve to provide a vacuum holding force on said reciprocating member to hold said member out of contact with said cam.

2. The combination according to claim 1 wherein a spring biased expandable surge chamber is connected to said second conduit to convert the intermittent pressure pulses of said pump means to a steady pressure fluid flow to said spray nozzles.

3. The combination according to claim 1 wherein said pump means further includes a rigidly mounted base and a movable pump cylinder for receiving said reciprocating member with means being provided to resiliently bias said cylinder against said base, whereby said cylinder will move away from said base against said bias under the force of said cam upon freezing of said reciprocating member with relation to said cylinder.

4. A windshield cleaning system comprising a washer unit including pump means having a reciprocating member to displace liquid onto an associated windshield, a wiper unit including selectively operable motor means, a rotating cam member driven by said motor means and contacting said reciprocating member to operate said pump means concurrently with said wiper unit, and manually operated means for selectively closing off the suction side of said pump to provide a vacuum holding force, whereby said reciprocating member is held out of contact with said rotating cam.

5. A windshield cleaning system comprising, a source of fluid, pump means including a reciprocating member to displace fluid from said source onto an associated windshield, wiper motor means, cam means driven by said motor means for contacting said reciprocating member to operate said pump means concurrently with said wiper motor, and means for selectively closing off the suction side of said pump means, whereby said reciprocating member is held out of contact with said cam means.

6. The combination according to claim 5, wherein a spring biased expandable surge chamber is connected to the outlet side of said pump means to convert the intermittent pressure pulses of said pump means to a steady pressure fluid flow to said spray nozzles.

7. The combination according to claim 5 wherein said motor means constitutes an electrical motor and wherein said means for closing off the suction side of said pump means comprises a combination valve and switch unit located between said pump means and said fluid source, whereby said combination unit may be operated to selectively control the operation of said motor and the suction side of said pump means may be closed off to provide a vacuum holding force on said reciprocating member to hold said member out of contact with said cam at the will of an operator.

8. The combination according to claim 5 wherein spring biased lost motion means is incorporated within said pump means to permit movement of said reciprocating member with relation to said cam means in the event said reciprocating member becomes frozen with respect to the pump means.

9. A windshield cleaning system comprising, a washer unit including a source of fluid, pump means including a reciprocating member to displace fluid from said source onto an associated windshield, nozzle means for directing said displaced fluid toward the windshield, inlet and outlet conduit means for connecting said pump means to said source and to said nozzle means, a wiper unit including motor means, cam means driven by said motor means for contacting said reciprocating member to operate said pump means concurrently with said motor means, valve means connected to said inlet conduit means for selectively closing off said inlet conduit means, whereby said reciprocating member is held out of contact with said cam means by a vacuum force, and spring biased lost motion means incorporated within said pump means to permit movement of said reciprocating member with relation to said cam means in the event said reciprocating member becomes frozen with respect to the pump means.

10. In a windshield cleaning system, pump means for displacing liquid, said pump means having a reciprocating member, a stationary base, a movable cylinder for receiving said reciprocating member, and means for resiliently biasing said cylinder against said base whereby said cylinder and said reciprocating member will move as a unit away from said base against the force of said biasing means upon freezing of said reciprocating member with relation to said cylinder.

11. In a windshield cleaning system, pump means for displacing liquid, said pump means including a stationary base, a cylinder having a liquid inlet means and a liquid outlet means, means to bias said cylinder against said base, a piston located in said cylinder and movable to a first position to draw liquid through said inlet means into said cylinder and movable from said first position to a second position to discharge liquid through said outlet means, said piston having a piston rod extended longitudinally of said cylinder and through said base, and spring means for biasing said piston to the first position, whereby upon operation of said pump means said cylinder and piston will separate as a unit from said base upon freezing of said piston in the first position.

12. In a windshield cleaning system, pump means for displacing liquid, said pump means including a stationary base, a cylinder having a liquid inlet means and a liquid outlet means, means to bias said cylinder against said base, piston means having located a piston portion located in said cylinder and movable to a first position to draw liquid through said inlet means into said cylinder and movable from said first position to a second position to discharge liquid through said outlet means whereby upon operation of said pump means said cylinder and piston means will separate as a unit from said base upon freezing of said piston in the first position.

13. In a windshield cleaning system for an automotive vehicle having a wiper motor, a rotary cam driven by said motor, a source of liquid, spray nozzles mounted adjacent an associated windshield, conduit means for conveying liquid from said source to said nozzles, selectively operable valve means located in said conduit means for blocking said conduit means, and a liquid pump means mounted on said motor in a driven relation with said rotary cam, and including a stationary base, a pump cylinder connected in said conduit means between said valve means and said nozzles, means to spring bias said cylinder against said base, a pump piston located in said cylinder and including a piston rod extending through the wall of said cylinder and through said base to be contacted and driven by said rotary cam, return spring means for biasing said piston rod against said cam, whereby said cylinder and piston will separate as a unit from said base under the force of said cam upon freezing of said piston rod in its extended position and whereby said selectively operable valve may be operated to block the suction side of said pump to hold said piston rod in its retracted position out of contact with said cam.

14. The combination according to claim 13 wherein said pump cylinder includes a bypass passage, a spring biased bypass valve located in said passage and a bypass conduit connecting said passage to said source of liquid.

References Cited in the file of this patent

FOREIGN PATENTS 860,087     Great Britain _____ Feb. 1, 1961